United States Patent [19]

Rozmanith et al.

[11] Patent Number: 5,179,652
[45] Date of Patent: Jan. 12, 1993

[54] METHOD AND APPARATUS FOR STORING, TRANSMITTING AND RETRIEVING GRAPHICAL AND TABULAR DATA

[75] Inventors: A. Martin Rozmanith, Cherry Hill, N.J.; Anthony I. Rozmanith, 118 W. Riding Dr., Cherry Hill, N.J. 08003

[73] Assignee: Anthony I. Rozmanith, Cherry Hill, N.J.

[21] Appl. No.: 450,606

[22] Filed: Dec. 13, 1989

[51] Int. Cl.$^5$ ............................................. G06F 15/20
[52] U.S. Cl. .................................... 395/155; 395/148
[58] Field of Search ..................... 364/518, 521, 523; 395/153-155, 161, 147, 148

[56] References Cited

U.S. PATENT DOCUMENTS

| | | | |
|---|---|---|---|
| 4,623,147 | 11/1986 | Ackerman et al. | 273/1 |
| 4,648,036 | 3/1987 | Gallant | 364/300 |
| 4,648,037 | 3/1987 | Valentine | 364/408 |
| 4,723,211 | 2/1988 | Barker et al. | 364/900 X |
| 4,739,477 | 4/1988 | Barker et al. | 364/900 X |
| 4,760,390 | 7/1988 | Maine et al. | 340/747 |
| 4,764,867 | 8/1988 | Hess | 364/200 |
| 4,769,762 | 9/1988 | Tsujido | 364/521 |
| 4,777,485 | 10/1988 | Costello | 340/799 |
| 4,779,080 | 10/1988 | Coughlin et al. | 340/712 |
| 4,949,248 | 8/1990 | Caro | 364/200 |

Primary Examiner—Heather R. Herndon
Attorney, Agent, or Firm—Synnestvedt & Lechner

[57] ABSTRACT

A method and apparatus for rapid search and co-display of graphics and tabular data for both local and distributed computer systems. The method rapidly selects and displays related graphical and text information via a Graphical User Interface (GUI) from both a Graphical Relationship Database (GRDB) and large tabular database. An operator enters a query where previously encoded and stored graphics elements are selected, via a control program, from a local mass storage device and displayed with related text information on a local display. This method provides intelligent selection and display of graphics data based on an analysis by the system as to what graphics elements or images are required to satisfy the operator query, and how these elements are to be displayed in conjunction with related tabular (text) data.

28 Claims, 9 Drawing Sheets

FIG. 3A
( CONTINUED ON NEXT SHEET )

METHOD AND APPARATUS FOR STORING, TRANSMITTING AND RETRIEVING GRAPHICAL AND TABULAR DATA

FIELD OF THE INVENTION

The present invention is related in general to interactive database graphics display and textual information systems. In particular, the present invention is directed to an improved method and apparatus for providing rapid display of such information on single user systems, local and wide area networks.

BACKGROUND OF THE INVENTION

The present invention is directed to an improved method and apparatus for the rapid search and co-display of graphics and tabular data for both local and distributed computer systems. The apparatus and method of the present invention rapidly selects and displays related graphical and textual information via a Graphical User Interface (GUI) from both a Graphical Relationship Database (GRDB) and tabular database. An operator enters a query or option request in which previously encoded and stored graphics elements are selected, via a control program, from a local mass storage device and displayed with related textual information on a local display.

Existing systems which utilize a central unit with multi-user terminals connected via conventional telephone lines cannot be upgraded to provide graphics and multi-tasking displays. The implementation of a GRDB and a GUI on a conventional network relying on a communication link over existing telephone lines is presently unfeasible due to the volume of data and the limited data transmission rates. The highest rate feasible over telephone lines is presently 9600 baud. Under presently available technology, it requires two minutes to transmit a standard 300 dpi scan of a photograph via standard communication lines. Also, the frequent screen updates required by a GUI would strain this type of data transmission. The potential bottleneck is thus created because graphics data is not on-site, but rather must be transmitted via conventional telephone lines from a remote location.

The system of the present invention makes a network implementation incorporating a GRDB feasible, without the limitations posed by conventional telephone transmission lines. First, the bulk of the data (typically over one gigabyte of graphics data), including pictorial representations, and possibly, prerecorded tabular or other information is stored locally. The present invention thus effectively creates two linked databases, the latter of which is stored on-site so as to provide instantaneous graphics responsive to the character based tabular data which is easy to quickly transmit via conventional communication lines. This on-site storage can be provided using existing mass storage technology such as a WORM (Write Once Read Many) drive, a hard disk drive, or other large storage device. In an alternative embodiment, both the graphical and tabular data are stored on-site.

The PC (personal computer) market has long had a need for a system incorporating graphical data within a distributed database. A graphically oriented user interface for multi-distributed, interactive local use with coordination and distribution provided by an interactive host and network system would be a major advancement, and would greatly improve the efficiency of end users thus providing them with a considerable advantage over users who do not implement such a system.

It is therefore an object of the present invention to provide a system which incorporates a GUI for selecting database options from a remote host computer.

It is a further object of the present invention to provide a system which incorporates transmitted tabular data in conjunction with a locally stored graphics database.

It is still a further object of the present invention to provide a system in which a remote host computer processes a query from a local computer system, transmits tabular data to the local computer, which then selects associated graphical data from a locally stored GRDB.

It is still yet a further object of the present invention to provide a system in which a remote host processes a query from a local computer system, transmits an address command to the local computer, which then selects both tabular and graphical data from a local database responsive to the address command.

The method and apparatus of the present invention provide intelligent selection and display of graphics data based on a analysis by the system as to what graphics elements or images are required to satisfy the operator query, and how these elements are to be displayed in conjunction with related tabular (text) data. This method further permits the display of high resolution graphics on an inexpensive workstation, (such as the IBM Personal Computer) since each image is stored in toto, rather than generated for each operator selection.

The control program enables the networking of large, distributed databases because the graphics data is not transmitted from a host, and a low speed (9600 baud or less) data communications can be used. In a campus or local environment this would preferably comprise fiber optic (FDDI) connecting a host and multiple end users and/or a host and local computers connected via 9600 baud connections over existing phone lines. The method of the present invention is easy to use, preferably through the use of a graphical user interface (GUI), driven by a combination of a mouse and keyboard for data input and manipulation.

SUMMARY OF THE INVENTION

The present invention is an improved presentation system combining presently available computer hardware and software with an additional graphic oriented software front end for specific applications which combines large tabular and graphic databases with a rapid, combined search and display capability for selected and related data from both databases. Output is displayed on a linked terminal or microcomputer such as a personal computer (PC).

In accordance with the present invention apparatus for storing and retrieving graphical and tabular data comprising: local computer means having CRT display means and storing a program containing a plurality of presentation options, said local computer further containing a graphical user interface program; presentation selection means in communication with said program containing said presentation options for selecting a particular option to be transmitted to host computer means; transmission means for transmitting said selected option to said host computer means, said host computer means containing a control program which selects a graphical relationship database and tabular database command which matches said selected presentation option, said host computer means transmitting said database command by said transmission means to said local computer means wherein said command is displayed on said CRT display means by said graphical user interface; and graphical relationship database means for storing graphical data and for transmitting graphical data responsive to said command directly to said CRT display means in response to a second command from said graphical user interface program.

The present invention further provides a method for controlling the transmission and retrieval of tabular and graphical data as recited in the following steps: selecting a presentation option from a local station; transmitting said selected presentation option to a remote host computer; selecting a graphical and tabular data command using said host responsive to said transmitted selected presentation option; transmitting said responsive graphical and tabular data command from said remote host to said local station; selecting a graphical presentation from a locally stored graphics database responsive to said graphical and tabular data command; and displaying said selected graphical presentation on a display associated with said local station.

DETAILED DESCRIPTION OF THE INVENTION

Figure 1A:
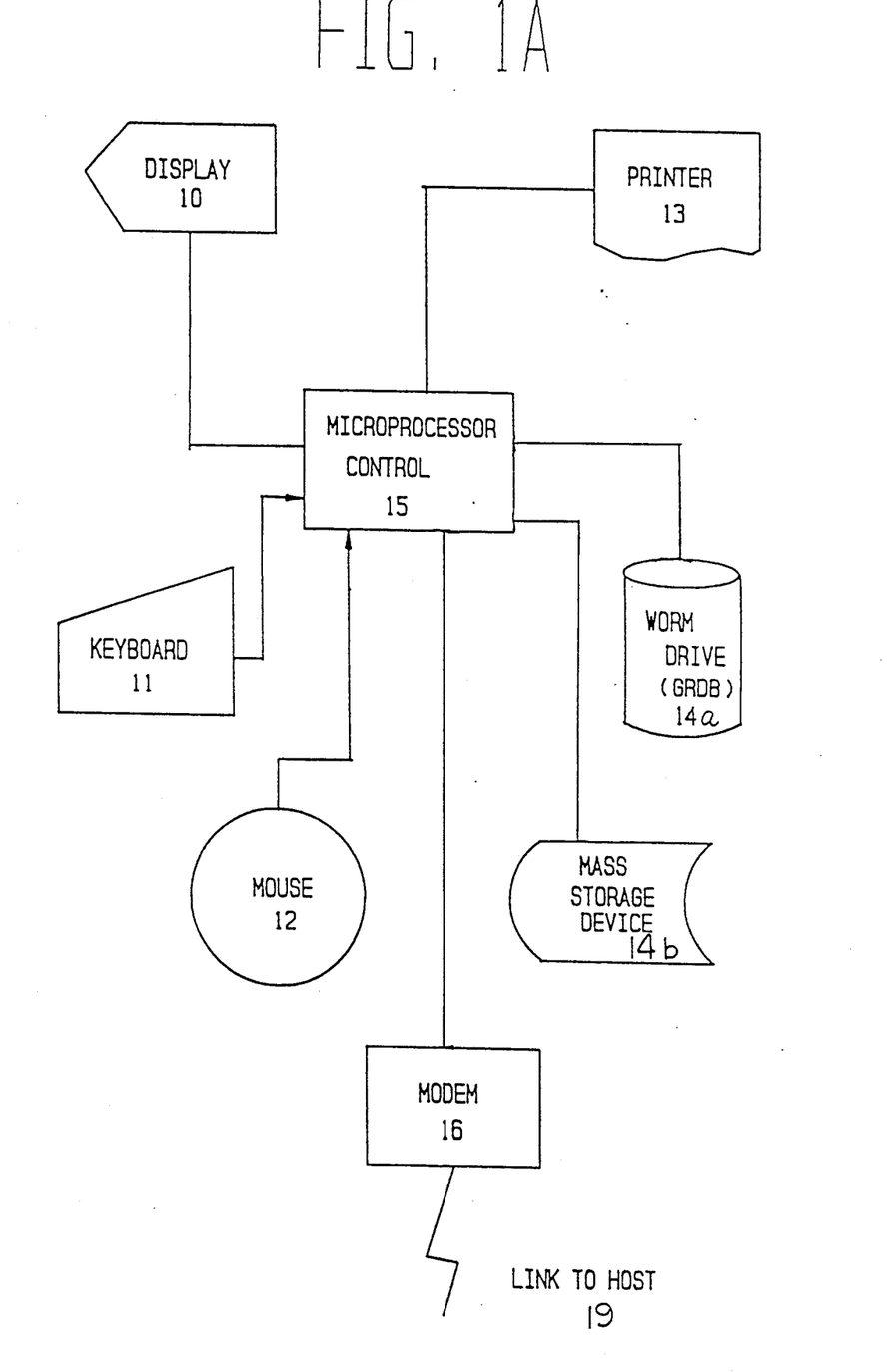
FIG. 1A is a block diagram of a single user interactive presentation system utilized in the present invention.

The present invention is described with reference to the enclosed Figures wherein the same numbers are utilized where applicable. FIG. 1A is a block diagram of the interactive information handling and presentation system of the present invention. The system as shown, comprises a display device 10, which can comprise a monochrome graphic or high resolution color graphic CRT display. Display device 10 displays information to the operator. The system further comprises a keyboard 11 and mouse 12 (optional) which the operator uses to enter information, including both commands and data, into the system. Printer 13 functions to provide hard copy output of information selected by the operator. Mass storage system including a WORM (Write Once Read Many) drive 14 stores encoded GRDB records.

WORM (Write Once Read Many) 14 is used in the present invention as the mass storage device for the GRDB. For the purposes of this disclosure, the term graphics refers exclusively to pictorial representations such as a raster image. WORM 14 is a large mass storage device that supports random access to data stored on the device. In addition, the present invention can utilize any magnetic, optical, CD, or magneto-optical mass storage system. The interface from the computer or workstation to the WORM is an SCSI (Small Computer Serial Interface) interface (not shown), which is controlled by an intelligent interface attached to the computer bus. The SCSI controller in a multitasking environment (UNIX, OS/2 or others) will search WORM 14 for data independent of the computer CPU, thereby facilitating very rapid data access. The SCSI interface supports a high data transfer rate of at least twice that of the "standard" ST506 interface used in typical fixed disk and other computer peripherals.

Used in conjunction with a control program to be more fully discussed herein, the WORM 14 is transparent, and acts only as a mass storage device for graphic data. WORM 14 can also store tabular data. Creation of the WORM for distribution to end users and for updates of the GRDB, allows optimized placement of data on the WORM so as to further speed and access to the data in daily operation of the system.

A fixed disk within the system 15 stores applications software and temporary work files data. Fixed disk 15 can also serve as an alternative to WORM 14. The system also includes a modem 16, which functions via standard voice grade communications lines, to interconnect a more powerful host system that stores the master tabular database and the control program. It is to be appreciated that the communication or transmission system may utilize cellular, microwave, satellite or other wide band communications means which provide a data transmission rate of 1200 bps or greater. A cellular system would be particularly useful in applications in which a local area network would be overwhelmed, such as in a convention center.

It is assumed for the purpose of explanation that the computer system shown in FIG. 1A is a general purpose, programmable system such as an IBM Personal Computer (e.g. PC,XT,AT or a compatible of similar type) connected to a more powerful host computer system 19, such as an Intel 80386, 80486, 80X86 microprocessor or Motorola 68000 series microprocessor with workstation supporting multiple incoming communications lines. The host computer system 19 may also incorporate addition coprocessors.

In order to operate the system of FIG. 1A, the operator initially turns on the system unit 15. The microprocessor in the system unit 15, which typically will be no more powerful than an Intel 80286, performs the initial program load function which tests the processor hardware and loads the operating system and graphical user interface (GUI) into memory. Microsoft Windows is a preferred GUI in the present invention because it is the most widely accepted graphical user interface for the IBM PC compatible family of computers. However, other comparable GUI programs are equally applicable in the present invention. The operator then selects applications from a menu using either a keyboard 11 or, alternatively, a pointing device such as a mouse 12.

Figure 2:
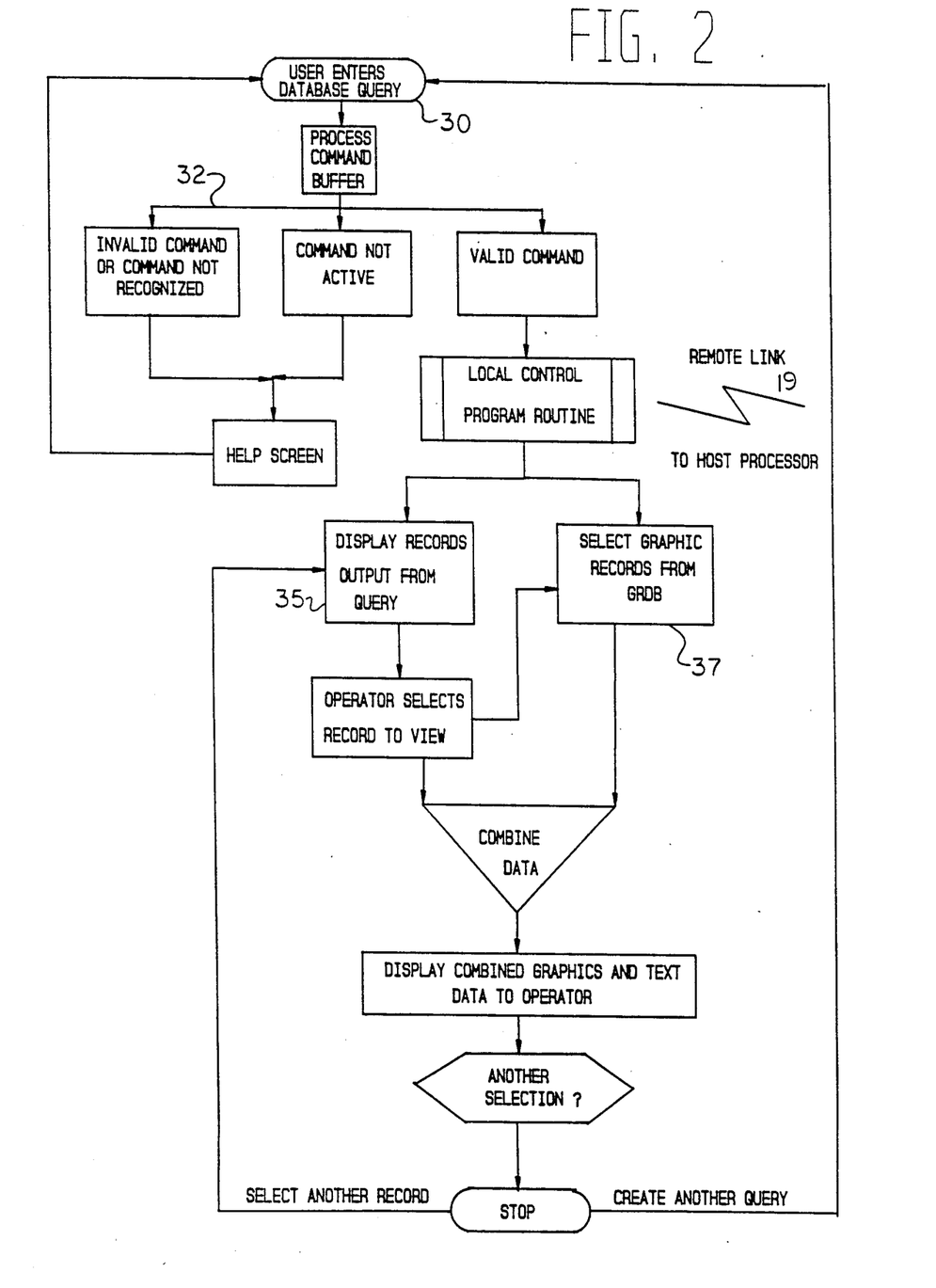
FIG. 2 is a flow chart of the presentation selection system of the preferred embodiment.

In operation, the operator would either select a presentation option from the menu of applications, or, alternatively, the presentation system could be configured to load automatically by the system after the power is activated. Referring to the flow chart of FIG.

2, the general organization of the presentation system process is illustrated. The presentation system is controlled by a local control program. Initially, the operator enters a database query 30, selecting options from either menu(s) or by entering data on a command line. Depending upon the particular application, the query consists of one or more search criteria or options which will be processed by the remote host computer so as to identify one or more database files responsive to one or more of the criteria or options.

The presentation system initially determines whether the query is valid 32. If valid, the query is transmitted via modem 16 over conventional telephone lines (or through cellular, microwave, or other wide band transmission system) to a remote control program residing on the remote host computer 19. Alternatively, in a second embodiment shown in FIG. 1B and more fully described below, the query may be processed locally (via a network or local model of system) by a host computer located on site. In either case, the control program processes the data in the identical manner.

When the processed query is transmitted back from the remote host computer 19, the operator has the option of displaying records output from the query 35 or selecting graphic records from the GRDB 37. Depending upon the operating system of the local computer, the local control program can concurrently perform display of selected records, retrieve graphic information from the local GRDB as well as send and receive information from the host 19. This multitasking feature is available under UNIX, Xenix and OS/2 versions of the system. An AutoCard software ported to an SCO Open Desk top program is a preferred configuration in a host system.

The operation of both the local and remote control programs are more detailed in the algorithmic flow chart of FIG. 3. This Figure details the interrelationship of the local and host control programs, and specifically how both test the integrity of data after transmission, parse data, test and process error conditions, and process the database queries.

Figure 3A:
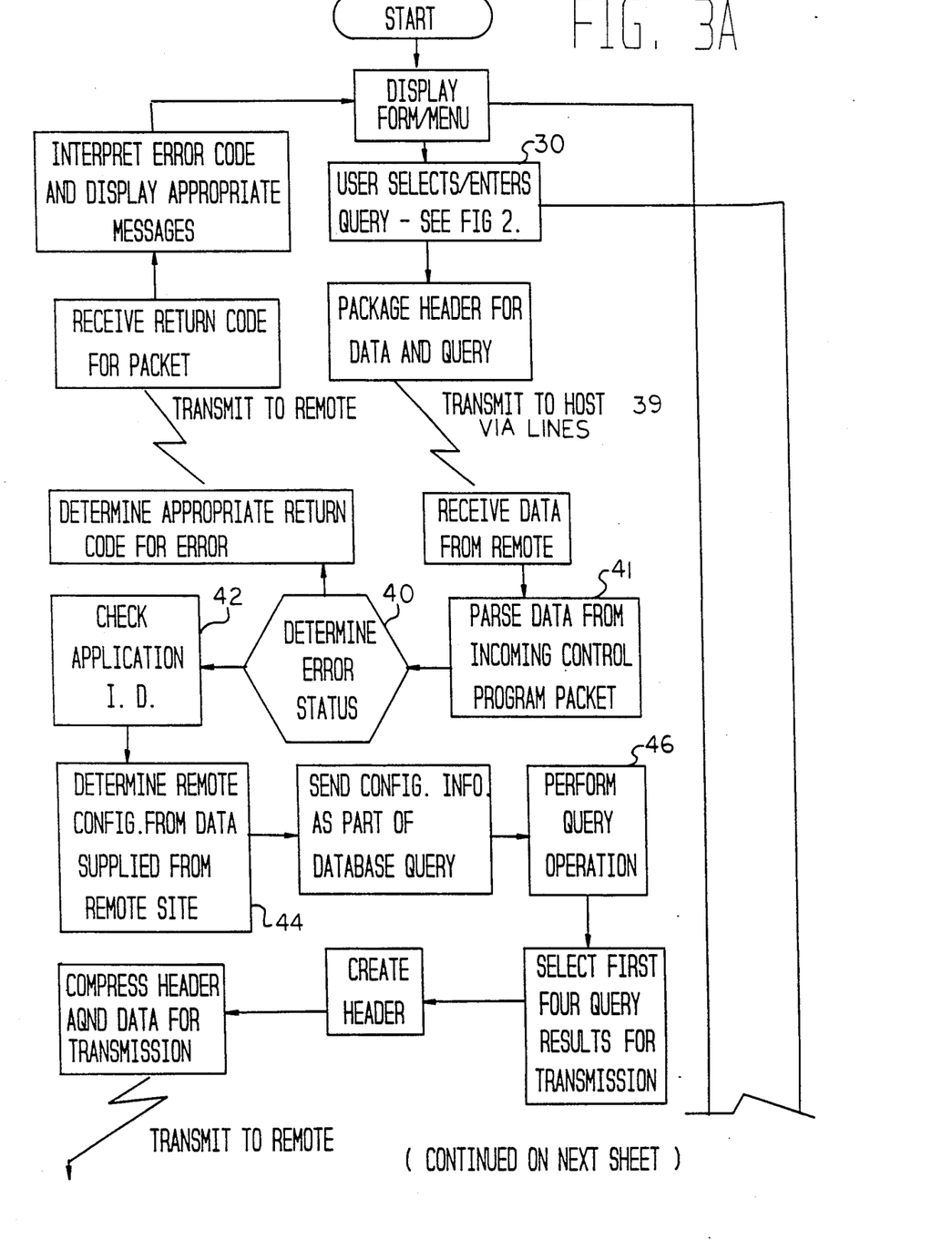
FIGS. 3A and 3B are algorithmic flow charts which sets forth the steps utilized by the local or host control program of the preferred embodiment.
Figure 3B:
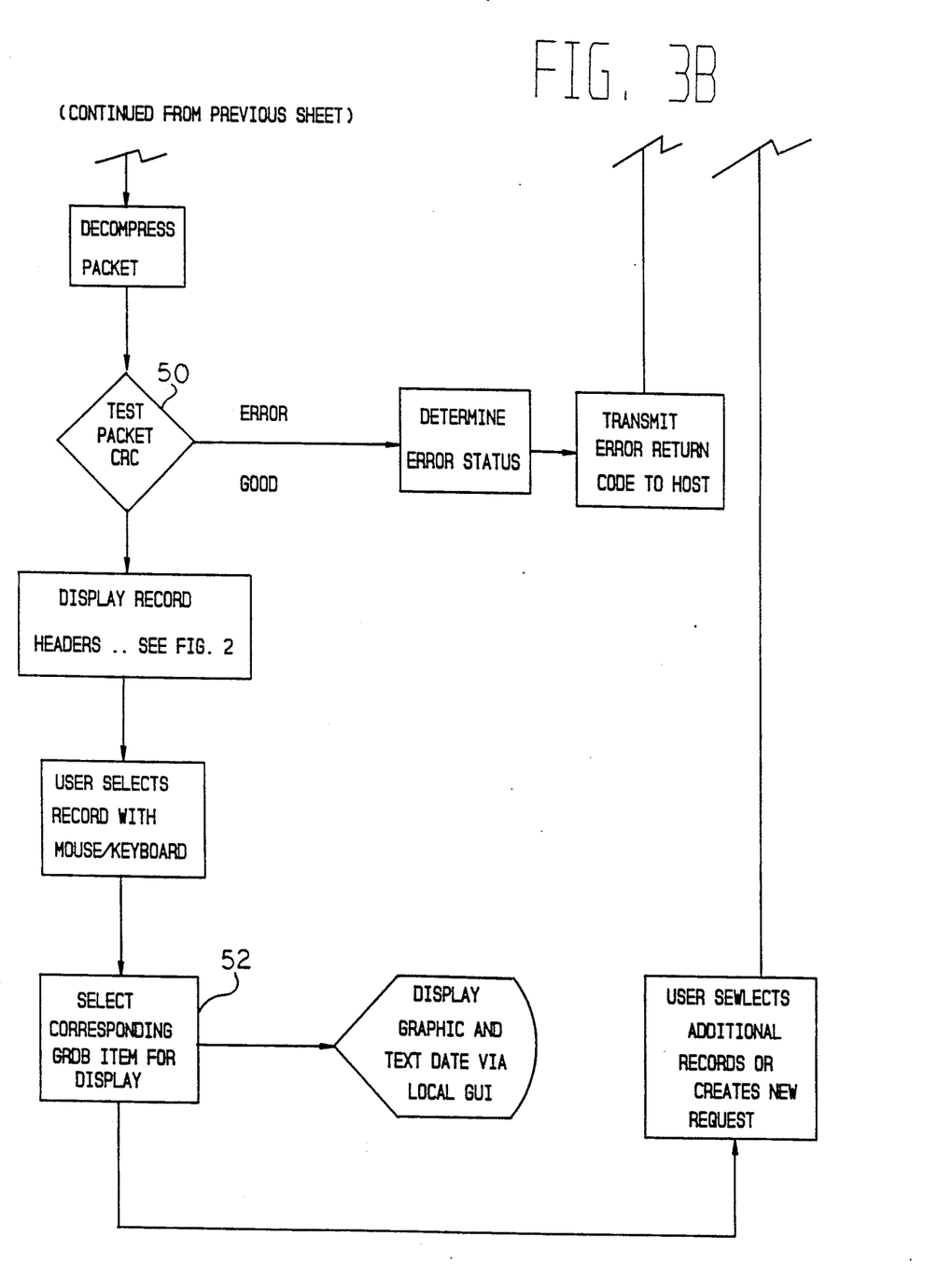

As shown in the flow chart of FIGS. 3A and 3B, the user initially selects or enters a query, 30. This process is discussed above with reference to the discussion of FIG. 2. The local program generates header information which includes the configuration of the local computer. The header and query are compressed and then transmitted as a packet to the host 19 via communication or transmission lines 39.

Upon receipt, the data is decompressed, parsed by the host 41, and checked for errors 38. The present invention incorporates a cyclical redundancy check (CRC) to determine if there were errors during transmission. If there were errors during transmission, an error status signal is generated 40 and the packet is returned to the local computer via transmission lines 39. If there were no errors during transmission, the host control program determines the Application ID 42 and the remote configuration of the local computer 44 which transmitted the data. This enables the host to format the ultimate command so as to be compatible with the local system. The host computer 19 can utilize any suitable software such as SCO Xenix or Open Desktop software or any software package providing necessary options and commands for all end users in the system. The Application ID distinguishes the application which will use the data sent in the packet (e.g. a multi-listing service for real estate).

The host 19 then processes the query 46, thereby identifying a plurality of files responsive to the query criteria. The host then selects a preset number of selected files for transmission 48. In the preferred case, the preset number is four. However, it must be stressed that this number may be varied widely according to application, as well as the needs and discretion of the user. The selected data is then transmitted back to the local computer system. As with the remote program, the local program similarly checks for transmission errors 50. If there are no transmission errors, the selected files may be displayed and the user may select corresponding GRDB data 52 from WORM 14. The user also has the option of requesting the transmission of additional files 54, assuming that the total number of files identified by the host upon execution of the query exceeded the preset number.

The following is a detailed listing of the control program packet specifications of the present invention which is included for the benefit of those skilled in the art.

General Packet Format

| STX (start-of-text) | (1 to 4 bytes) |
| Packet Size in Bytes | (16-Bit Binary Numeric) |
| Sequence Number | (16-Bit Binary Numeric) |
| Record Type | (16 Bit binary) |
| Packet Data | (variable size) |
| Checksum Byte | (1 byte) |
| ETX (end-of-text) | (1 to 4 8-bit Bytes) |

PACKET SIZE IN BYTES—is the length in bytes of the Control Packet. It includes the Sequence Number, Record Type, and Packet Data.

SEQUENCE NUMBER—ensures the integrity of the Communications Line. A host system may send a SYNCHRONIZED message (Sequence Number 0) at any time. The message following the SYNCHRONIZED message must start with a 1 and be incremented with a 1 for each transmission.

RECORD TYPE—indicates the type of message being sent. There may be more information in the Data Packet, or the Record Type may be used alone.

PACKET DATA—contains actual data (hardware and graphics configuration information for end user workstation, encryption key, number of records matching query, index for GRDB and (up to) four database records selected by end user database query) being sent in the Packet. These files may or may not be present depending on the Record Type.

CHECKSUM BYTE—the sum of all the bytes of the Protocol Packet, including the data but not the checksum byte (nor the STX/ETX). Subtract the sum, and mask off everything but the lower 8 bits. The result is the checksum byte for the packet.

The operation of the local and remote control programs are more fully explained in the context of the following example which uses the present invention in a Real Estate MLS (Multi-Listing Service) application. In this application, the user will attempt to accumulate and intelligently evaluate identifications of housing units which satisfy one or more search criteria or options such as price, size and location.

Initially, after booting up the system, the user selects the MLS application from a menu on the display 10. The user may be presented with a fill-in-the-blank configuration on the CRT screen in which to enter search criteria, such as price range, house type, etc. Each space on the form may alternatively have a pop-up window with a set of choices. Alternatively, the user may enter this information using the keyboard.

The local control program generates a query 30 from the information on the form, and as described in FIG. 3, generates header information. The local computer then transmits the header and query to the host. This header includes the configuration of the local site (i.e. 80286 with EGA graphics), the application used (Multiple Listing Service in this example), serial number of the site (used for security on the host) and the operating system (PC-DOS, UNIX, or others).

After checking for errors, the host 19 receives the incoming packet and reads the data. The format of the information is preprogrammed in the host. The host parses the data to determine the origin of the data, the configuration limitations of the remote site, the application being used, and the data for the application.

The host then processes the database query, tabulates the output, and generates a preferably compressed packet to return to the local site. The packet returning to the local site contains the Host ID, Application ID, the number of successful records retrieved, and pointers from the (up to) the first four records retrieved, and address pointers from the (up to) four records retrieved to the local GRDB graphic records.

The local computer system receives the preferably compressed, packet from the host, parses the data, and displays the first several fields of the four records retrieved from the on the screen. Database records matching the operator's query may be displayed as tabular output. The operator has the option of selecting a specific graphical record to view from WORM 14, or entering another query using either the keyboard or mouse. The WORM 14 dumps the graphic files directly to display device 10 thus bypassing the local processor. The local user can then select any of the records and fully display them on the screen. For the MLS example, these records would include relevant real estate information such as listing price, details of the house for sale, utility and tax information as well as at least one monochrome, color still and or moving picture of the listing, a floor plan and a local map (if available).

The local user can then view another record, request additional records from the original query to be retrieved from the host, or create a new request using the original form as set forth in FIG. 3. Only a relatively small amount of data is transferred via communications lines, with the graphics elements or images stored locally on the WORM 14 rather than generated individually for each query.

While the above embodiment has been disclosed in the context of a system in which only the graphical data is stored locally, it is to be appreciated that alternatives are possible in which both the graphical and tabular data are stored locally, or in which the tabular and/or graphic is stored in part locally and/or remotely. In such a system, the host computer, after processing the query, transmits an address command to the local computer, which retrieves locally stored graphical and tabular data from WORM 14.

Figure 1B:
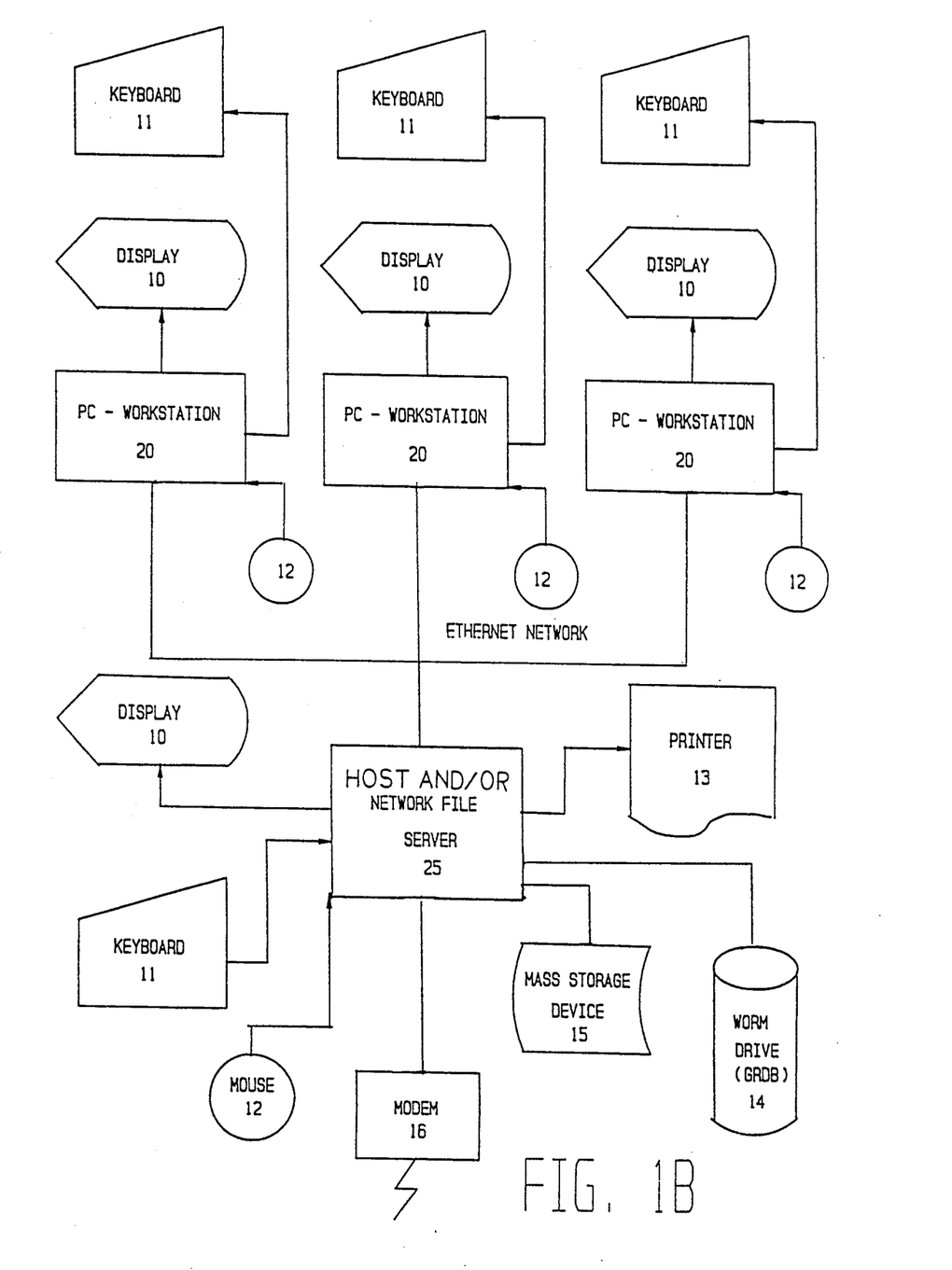
FIG. 1B is a block diagram of a networked interactive presentation system of the present invention in which several individual presentation selection systems share peripherals and a link to a more powerful host processor.

A system, according to this invention, can also comprise a host and several terminals in a multi-user local area network using simple multiple display devices, all located at a single location. Such a system is illustrated in FIG. 1B, where a PC Workstation 20 is the same device detailed in FIG. 1A. In this embodiment, a Network File Server 25, typically a more powerful processor (80386 or 80486 processors) than the attached end user workstation computer 20, is connected via Ethernet, Fiber Optic (FDDI), or other high speed data connection to the PC Workstation 20. The workstations 20 can comprise "laptop" or portable computers with graphics capability and local or portable mass storage devices 15' as described in FIGS. 1A, such as a COMPAQ LTE with an optional hard disk, IBM XT or AT compatible System, further with keyboard (and software compatibility) for such desktop PC's. Both tabular text and graphics records, the end results of the query are then displayed on the local display 10. The operator then has the option of selecting another record, printing the record displayed on printer 13 or entering another query.

As noted above, a preferred embodiment comprises a front-ended version of a standard graphical relational database (GRDB) running under Microsoft Windows. The implementation preferably could also incorporate a custom developed raster/vector/attribute graphic database (RVAD) used to obtain specific selection sets which are passed to the standard application. It should be noted that this type of implementation has applicability to other fields such as facilities management and/or inventory control.

RVAD is a method of overlaying a raster image, such as a map, visible to a person viewing a computer screen, over a vector space (part of which is the screen viewed by the local user). The vector space is virtual, and the raster image is a "window" looking at a portion of the vector space which is composed of four elements; points, lines, faces, and attributes. Points have one dimension, lines have two dimensions and faces are three dimensional. Attributes do not have a dimension, but for the purpose of the present disclosure, comprise database items associated with points, lines, and faces.

Each point, line, or face in the vector space can have multiple associated attributes. A user would select either a point, line or face from the overlay on the vector space, such as a map on the screen. The vector space is preferably bit mapped in order to provide background images. The selection may be an area, individual object, or a point on the screen. The area may be selected by clicking on a point, or "boxing" an area on the screen with a pointing device (mouse or digitizer) or the keyboard (arrow keys).

The selected area would then define the user database query, with the control program using the locations within the selected for the host database selection criteria. The host would then respond with the attributes or records associated with the selected locations, and display the first few text fields on the screen. The user can then select a record to fully display on the screen.

Figure 4:
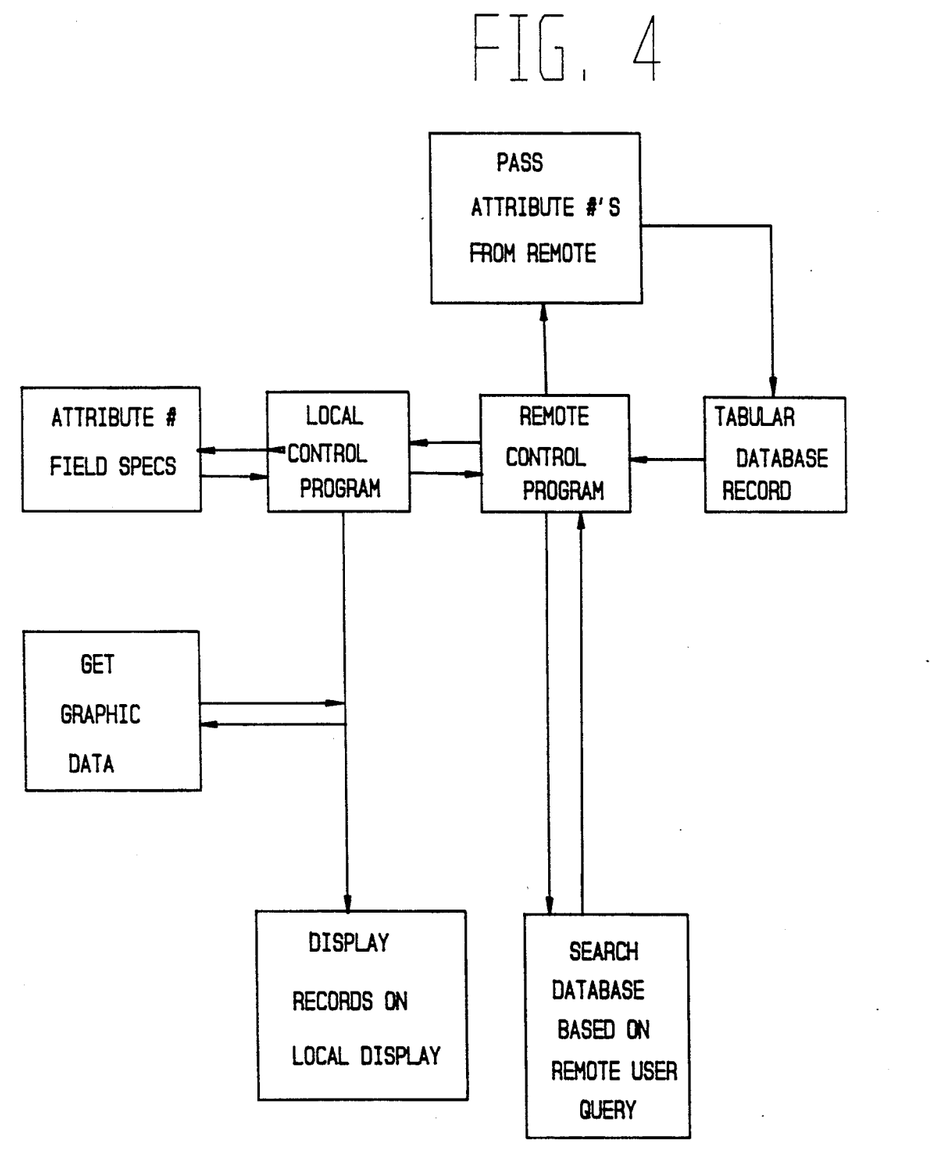
FIG. 4 is a block diagram illustrating the steps for a database search using RVAD.
Figure 5:
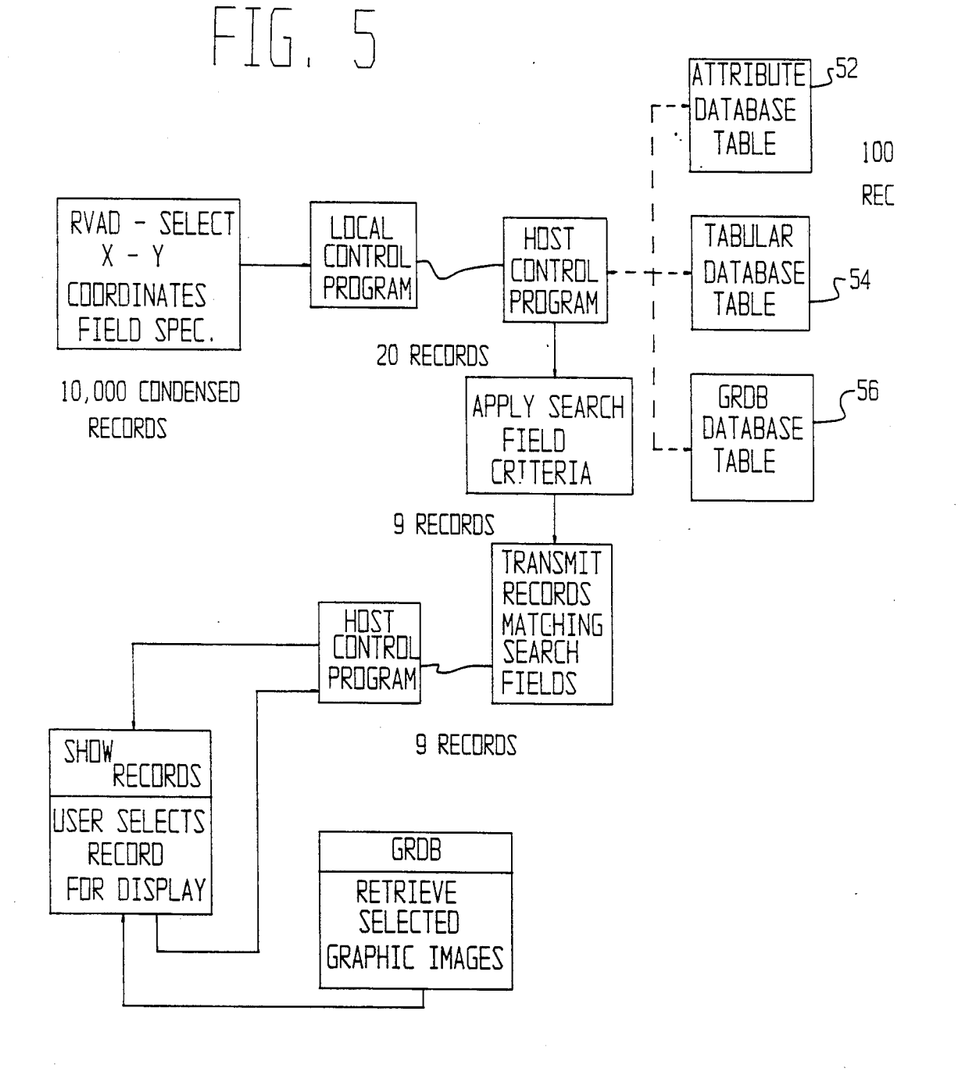
FIG. 5 is a block diagram of the control program for the RVAD of the present invention.
Figure 6:
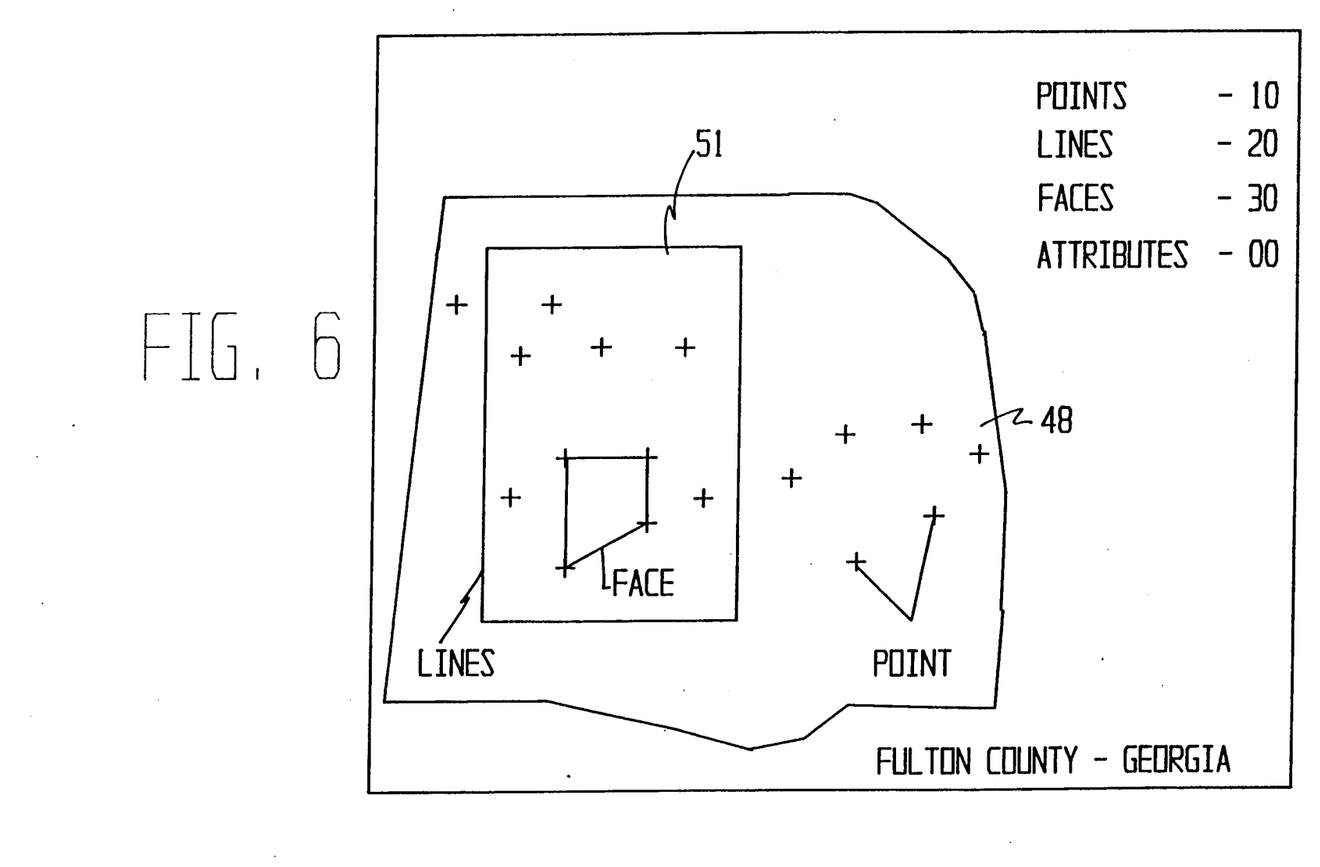
FIG. 6 is an illustration of a raster/vector space as actually shown on a CRT display.
Figure 7:
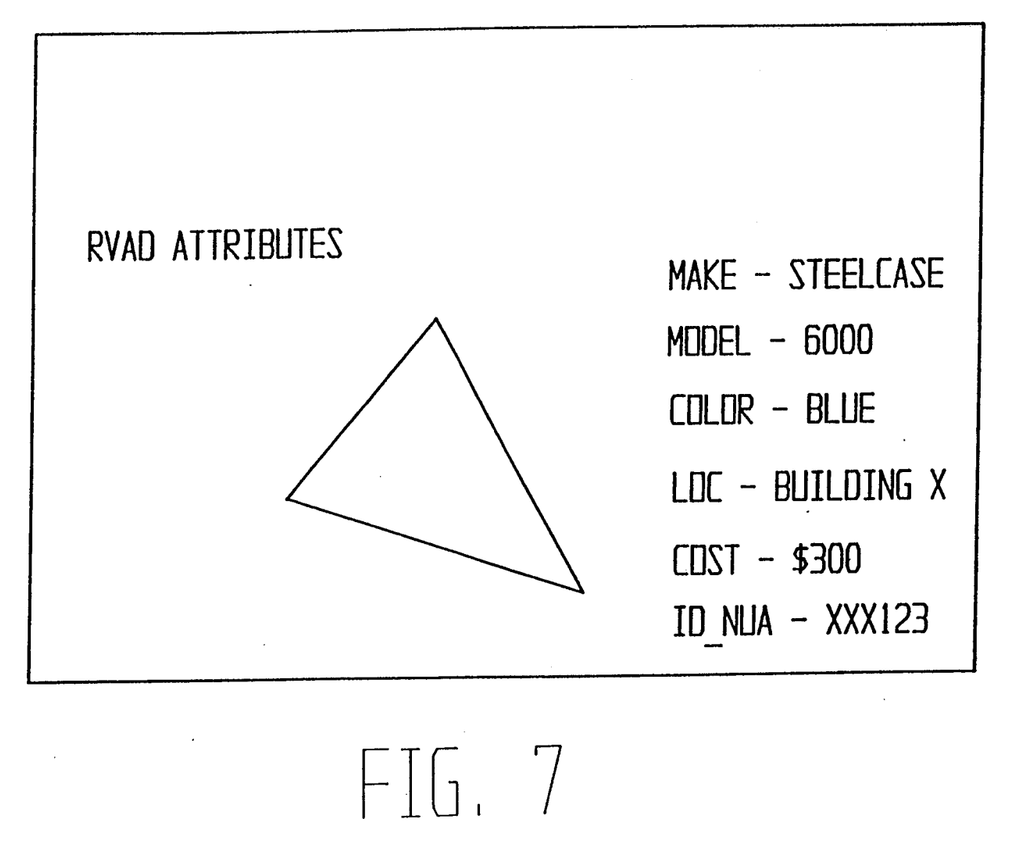
FIG. 7 illustrates the display of RVAD attributes on a CRT display.

The operation and advantages of an RVAD based system in the context of the present invention is explained by the following example and with reference to FIGS. 4–7. Referring to FIG. 6, the RVAD vector space may cover several counties in, for example, the state of Ga. Each of the counties contain a plurality of real estate listings, each of which is identified by a point. In total, there may be up to 10,000 points within the total vector space. A window 51 may cover a portion of one of the counties (Fulton County 48) of Ga. which contains, for example, 20 points. The potential home buyer or realtor would then type in other desired options, criteria or attributes such as price (e.g. less than $200,000), size (e.g. four bedrooms), etc. Referring to FIGS. 4 and 5, the query and twenty points defined within the window are then transmitted to the host. The local control program transmits the X-Y coordinates of the window to the host. The host initially determines how many of the 20 homes defined by each point possess one or more of the desired attributes or criteria 52. Assuming 9 homes contain one or more of the attributes, the host then obtains the tabular data for each file 54. The tabular data will typically comprise information such as the address of the listing, the asking price, and the age of the listing. Finally, the host retrieves the address point of the GRDB graphical data stored within the local WORM 56. It is to be stressed that because the configuration of the local computer has been identified to the host, the address pointer of the GRDB will be selected to conform to the limitations of the local system. For example, if the local system utilizes a monochrome printer and the listing corresponding to choice number 4 has three graphical configurations (monochrome, color, and animation), the host will select the monochrome address. In the present example, as set forth in FIGS. 3A and 3B, the first four files are then compressed and transmitted to the local system. The user may print this information locally, select another record to display, or select another area of the RVAD map and begin the process again.

As noted above, the present system can be utilized in accordance with a system in which both graphical and tabular data are stored locally. In such a system, the host control program processes the query and identifies address points for both tabular and graphical databases. Moreover, a system can be configured in which tabular data is stored both locally and at the remote host.

A further aspect of the system of the present invention and one which is particularly applicable to an RVAD based system, is the facilitation of the entry of new data entries (e.g. graphic and/or tabular) to the system. In the MLS example, discussed above, the hypothetical end user (e.g., a real estate office) would enter a new entry such as a real estate listing including the query criteria of location, asking price, size etc., and transmit to the host. The host would then assign a unique entry identification applicable to all local stations participating in the real estate listings serviced by the host. It will be clear to those skilled in the art that the host may provide host service for applications other than real estate. Any local station may be a subscriber to any number of the services provided by that host. In a preferred RVAD based system, the host would place the new listing on the vector space using triangulation with respect to previously entered entry points and transmit back to the local user. Other end users could periodically receive the new listing, either through periodic updates (e.g. nightly, weekly) or updates could be periodically piggybacked during each query. Two or more hosts may be linked in interactive operation thereby increasing the area and/or number of local stations serviced.

While the present invention has been described in the context of a multi-listing real estate application, it is to be appreciated that numerous applications fall within the spirit and scope of the present invention and that the present invention may be utilized in any application requiring interactive communications between a local query imitations and a host computer and/or the presentation of tabular search data with graphics.

The present invention has been described with reference to the above detailed description. It is to be appreciated that other embodiments fall within the spirit and scope of the present invention and that the true nature and scope of the present invention is to be determined with reference to the claims appended hereto.

What is claimed is:

1. A method for controlling the transmission and retrieval of tabular and graphical data as recited in the following steps:
   selecting a presentation option from a local station;
   transmitting said selected presentation option to a remote host computer;
   selecting a graphical and tabular data command using said host responsive to said transmitted selected presentation option;
   transmitting said responsive graphical and tabular data command from said remote host to said local station;
   selecting a graphical presentation from a local stored graphical relationship database responsive to said graphical and tabular data command; and
   displaying said selected graphical presentation on a display via a graphical user interface (GUI) associated with said local station.

2. The method of claim 1 comprising the additional steps of selecting tabular data respond to said graphical and tabular data command and displaying said tabular data on said display.

3. The method of claim 1 wherein said local station is a terminal.

4. The method of claim 1 wherein said local station is a computer.

5. The method of claim 1 wherein said locally stored database is stored on a write once read many CD-WORM.

6. The method of claim 1 wherein said locally stored database is stored on a hard disk drive.

7. The method of claim 1 wherein said host computer contains at least a 16 bit microprocessor.

8. The method of claim 1 wherein said host computer contains at least a 8 bit microprocessor.

9. The method of claim 1 wherein said display displays said tabular data while said graphical data is being retrieved from said locally stored graphics database.

10. Apparatus for controlling the storing and retrieving graphical and tabular data comprising:
    local computer means having display means, said local computer storing a program containing a plurality of presentation components said local computer means further containing a graphical user interface means for processing graphical data for display on said display means;
    selection means in communication with said computer to select a particular presentation component to be transmitted to host computer means;
    transmission means for transmitting said selected presentation component to said host computer means, said host computer means containing a control program for selecting graphical relationship database and tabular database commands which match said selected presentation component, said host computer means transmitting said commands by said transmission means to said local computer means wherein said command are displayed on said graphical user interface; and
    graphical relationship database means for storing graphical data and for transmitting graphical data responsive to said command directly to said display means in response to a command from said graphical user interface (GUI) to be displayed with said tabular data.

11. The apparatus of claim 10 wherein said graphical relationship database comprises write once read many (WORM) means.

12. The apparatus of claim 10 further comprising means for updating or extending said graphical relationship database.

13. The apparatus of claim 10 wherein said transmission means includes a modem.

14. The apparatus of claim 10 wherein said transmission means further comprises telephone transmission lines.

15. The apparatus of claim 10 wherein said transmission means comprises a local area network.

16. The apparatus of claim 15 wherein said local area network is linked by a fiber optic transmission system.

17. The apparatus of claim 10 wherein said graphical user interface (GUI) comprises a computer program stored in said local computer.

18. The apparatus of claim 10 wherein said host computer means matches the capacity of said local computer means.

19. The apparatus of claim 10 wherein said selection means comprises raster vector attribute database (RVAD) means.

20. The apparatus of claim 10 wherein said transmitted presentation component and transmitted graphical and tabular database commands are compressed.

21. The apparatus of claim 20 wherein said transmission means utilizes a broad band transmission system.

22. The apparatus of claim 21 wherein said broad band transmission system is a cellular communications system.

23. The apparatus of claim 22 wherein said transmission means further comprises conventional telephone lines.

24. Apparatus for storing and retrieving graphical and tabular data comprising:
   local computer means (CRT) cathode ray tube display means and storing a program containing a plurality of presentation options, said local computer further containing a graphical user interface (GUI) program;
   presentation selection means in communication with said program containing said presentation options for selecting a particular option to be transmitted to host computer means;
   transmission means for transmitting said selected option to said host computer means, said host computer means containing a control program which selects a graphical relationship database and tabular database commands which match said selected presentation option, said host computer means transmitting said database command by said transmission means to said local computer means wherein said command is displayed on said CRT display means by said graphical user interface; and
   graphical relationship database means for storing graphical data and for transmitting graphical data responsive to said command directly to said display means in response to a second command from said graphical user interface program.

25. The apparatus of claim 24 wherein said presentation selection means comprises a keyboard.

26. The apparatus of claim 24 wherein said presentation selection means comprises a mouse.

27. The apparatus of claim 24 wherein said graphical relationship database comprises write once read many (WORM) means.

28. The apparatus of claim 24 wherein said transmission means transmits said selected option at a rate of around 10,000 baud or less.

* * * * *